United States Patent [19]

Planke

[11] 4,142,636

[45] Mar. 6, 1979

[54] APPARATUS FOR SORTING CONTAINERS FOR LIQUIDS

[76] Inventor: Tore Planke, N3180 Nykirke, Norway

[21] Appl. No.: 808,750

[22] Filed: Jun. 21, 1977

[30] Foreign Application Priority Data

Jun. 28, 1976 [NO] Norway .................................. 762237

[51] Int. Cl.² .............................................. B07C 5/00
[52] U.S. Cl. ................................... 209/524; 209/932;
209/934; 209/657; 198/461; 198/462; 198/452;
198/367; 198/599
[58] Field of Search .................. 209/73, 74 R, 74 M,
209/75, 111.7 R, 111.7 T; 198/452, 448, 453,
461, 462, 367, 599, 637, 831

[56] References Cited

U.S. PATENT DOCUMENTS

| 2,389,696 | 11/1945 | Stiles ..................................... 198/452 |
| 3,323,633 | 6/1967 | Engel et al. ........................... 198/461 |
| 3,465,870 | 9/1969 | Paulsen ................................. 198/367 |
| 3,866,739 | 2/1975 | Sikorski ................................ 198/453 |
| 3,955,179 | 5/1976 | Planke ................................. 209/111.5 |

Primary Examiner—Allen N. Knowles
Attorney, Agent, or Firm—Nolte & Nolte

[57] ABSTRACT

Apparatus for sorting containers such as bottles according to their shape, size or color in which there is a conveyor along which the containers pass with a plurality of exits. Container recognition apparatus is provided which controls means to direct the different containers to selected ones of the exits.

18 Claims, 7 Drawing Figures

APPARATUS FOR SORTING CONTAINERS FOR LIQUIDS

BACKGROUND OF THE INVENTION

The present invention relates to an apparatus for sorting containers for liquids, e.g. bottles of various sizes, shapes or colours.

In breweries and mineral water factories it is a recurring problem that crates with return bottles do not contain bottles of the same size, shape or colour. It is, thus, a very time consuming process to sort out all these bottles, which is mostly done manually.

It is an object of the present invention to eliminate these known disadvantages as regards the sorting of containers for liquids, especially in breweries and mineral water factories.

DESCRIPTION OF THE FIGURES OF THE DRAWINGS

The above mentioned apparatus is characterized by the features appearing from the following claims and the following description with reference to the drawings.

DESCRIPTION OF THE PREFERRED EMBODIMENTS

In the following description the sorting of bottles is described by way of example, but obviously, said description holds good for other containers for liquids as well.

Figure 1:
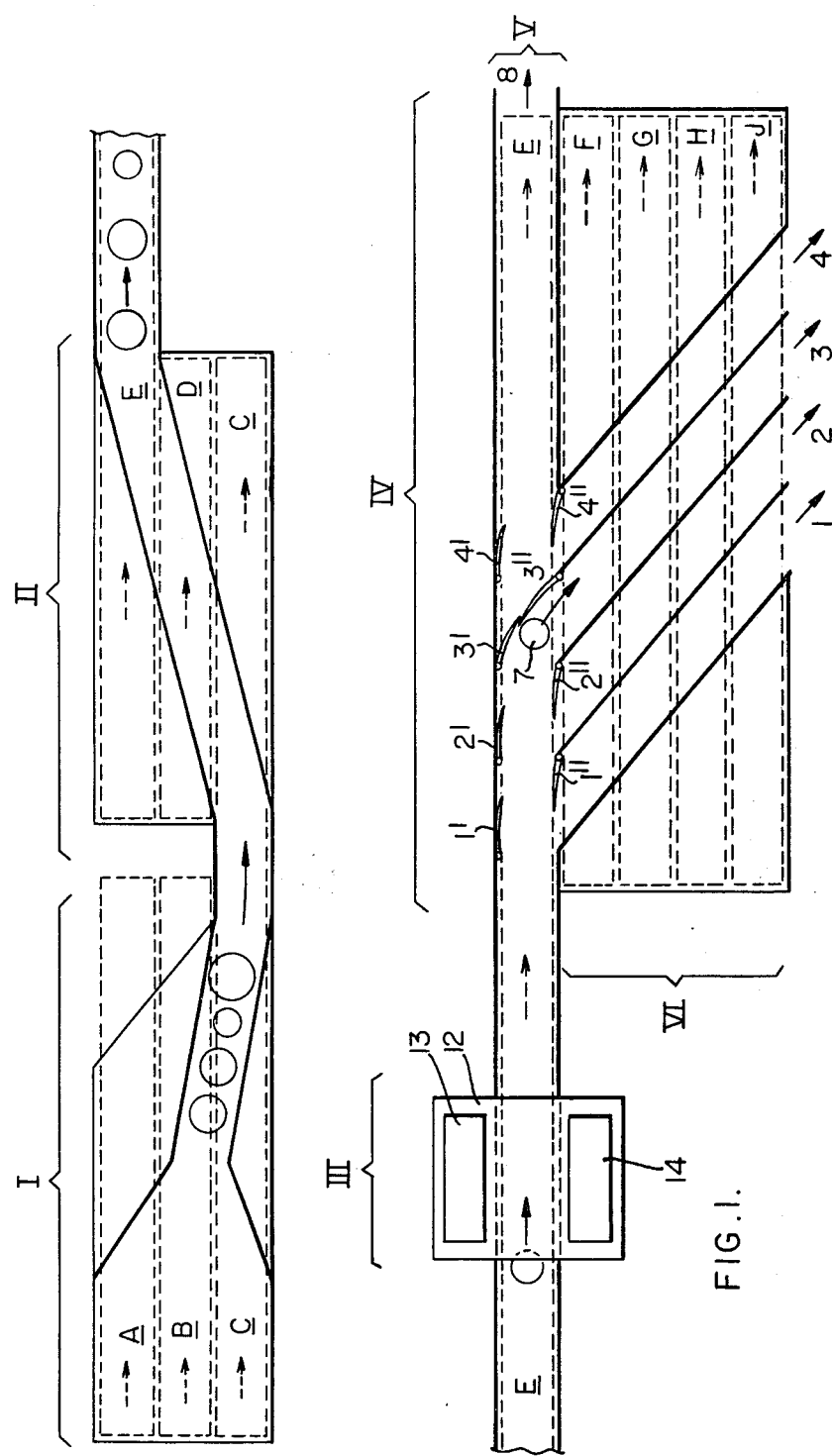
FIG. 1 is a diagrammatic view of a first embodiment of the apparatus according to the invention.

In FIG. 1 the reference I indicates a collecting station where bottles are supplied on conveyer belts A,B, and C, which belts preferably are moved with equal velocity. As shown uppermost in FIG. 1, the bottles are moved by the belt C to an acceleration station II, which in the disclosed embodiment comprises the conveyer belts C,D, and E. The belt D will have a higher velocity that the belt C, and the belt E will have a higher velocity than the belt D. Due to this difference of velocities the distance between bottles will be increased in in relation to said distance at the time of leaving the collecting station. This fact is indicated in the upper right hand corner of FIG. 1. The bottles are then moved past an optical detection station III comprising a detection device 12 with a source of light 13 and optical detectors 14, which are provided to detect the characteristic contours of the bottles by their silhouettes and if desired their colours.

The pattern detection may e.g. by carried out as described in the Norwegian Pat. No. 126 900 of the applicant's. The colour detection can be carried out by means known per se. In FIG. 1 the reference IV indicates the exit station of the apparatus. The exit station essentially comprises two zones, that is a gate zone V and a retardation zone VI. In the shown embodiment there are totally five exits from the exit station. The gates associated with the exits 1–4 resp., are marked 1′,1″; 2′,2″; 3′,3″, and 4′,4″ respectively. If a bottle is to pass through the exit 3, the gate 3′,3″ will be closed as shown in FIG. 1. The gates 1′,1″, and 2′,2″ will be open. If the bottles arrive to closely spaced on the conveyer belt E or one or more bottles have tipped and lie on the belt or if there are unidentified articles on the belt, all gates will be opened and the bottles will pass through the exit 8 and will possibly be recirculated in the system i.e. be brought back to the collecting station I. The retardation zone of the exit station consists of a series of parallel conveyor belts F,G,H, and J of which the belt F has preferably the same velocity as the belt E, the belt G has a lower velocity than the belt F, the belt H has a lower velocity than the belt G, and the belt J may have the same velocity as the belt H. By the aid of the retardation station it is ensured that the bottles pass through the exits 1–4 with an acceptable velocity. Preferably the velocity of bottles from the exit station IV can substantially equal the supply velocity at the collecting station I.

A suitable velocity of the supply and exit lines is e.g. approximately 1 m/second. This is a usual transport velocity for supply lines e.g. in breweries. The other operation velocities internally in the apparatus will preferably be two or three times said supply and exit velocities. However, in a preferred embodiment it will be possible to adjust the belt velocities e.g. between 0.2 and 3 m/second. Practical tests have shown that it is possible to work with a sorting rate of appr. 10–15 bottles/second.

The optical detection of the bottles is as mentioned carried out by the assembly 12. The mode of operation of said assembly is described. In connection with the detector zone of the assembly 12 it will be natural to provide a colour detector.

The electronic pattern detection of the bottles is essentially the same as described in connection with the applicant's Norwegian Pat. No. 126 900 and the U.S. Pat. No. 3,955,179, FIG. 8.

Figure 4:
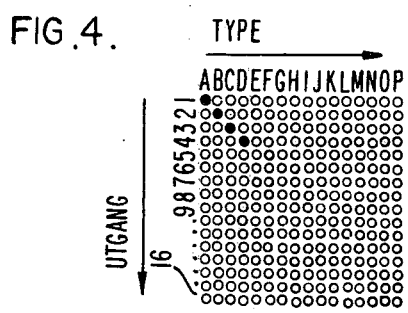
FIG. 4 discloses a typical programmation panel according to the invention.
Figure 5:
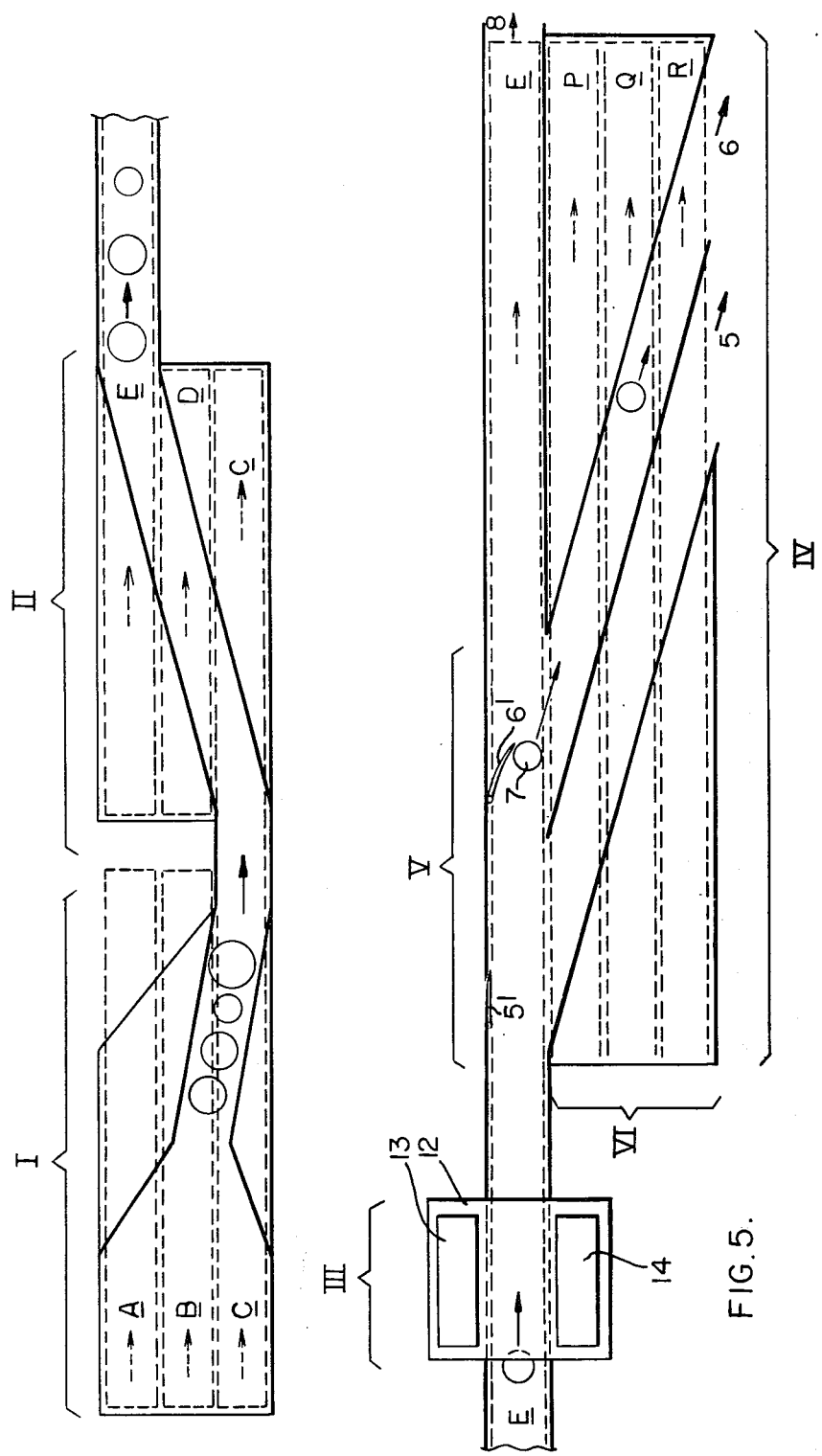
FIG. 5 is a diagrammatic view of a second embodiment of the apparatus according to the invention.
Figure 6:
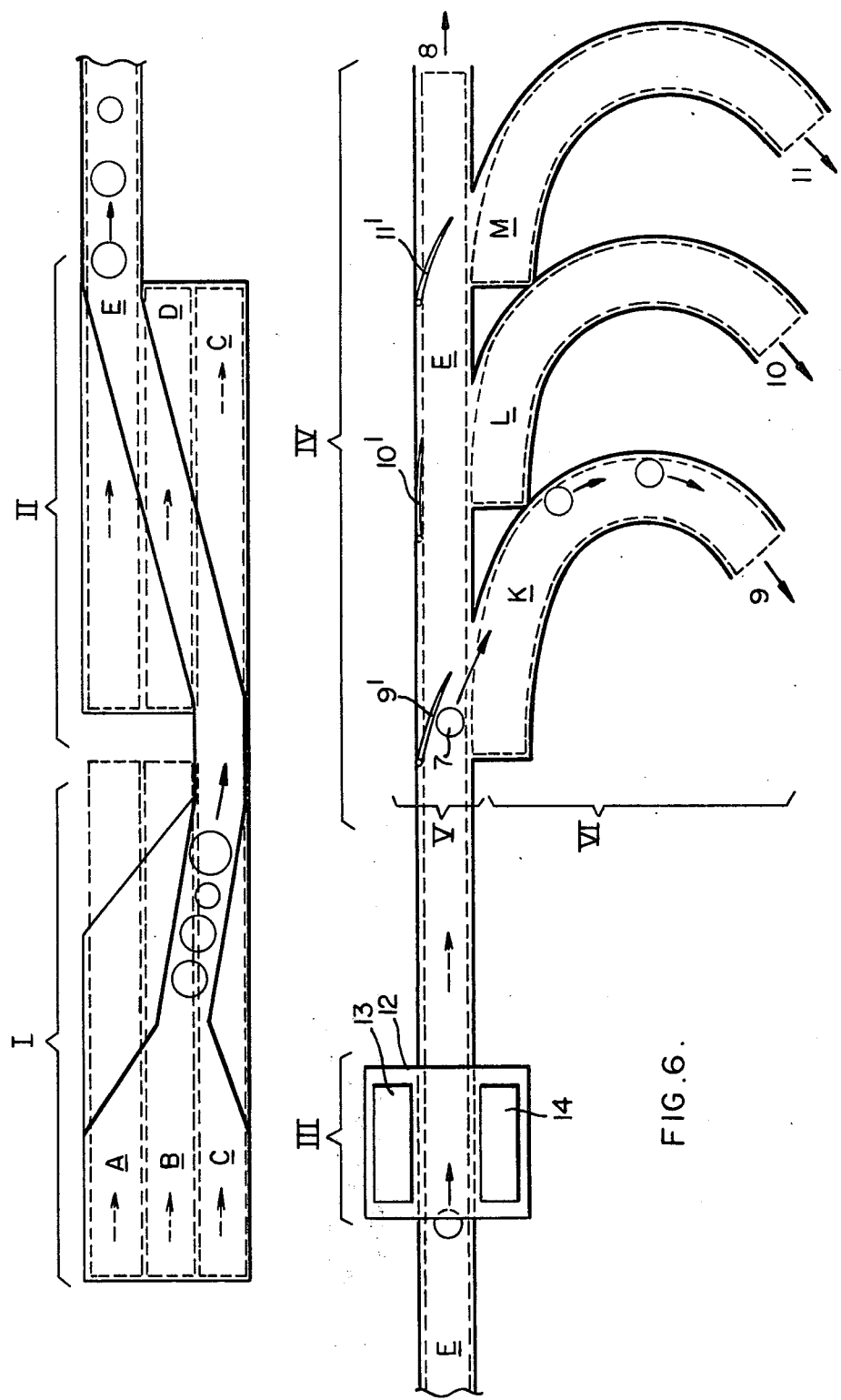
FIG. 6 is a diagrammatical view of a third embodiment of the apparatus according to the invention.
Figure 7:
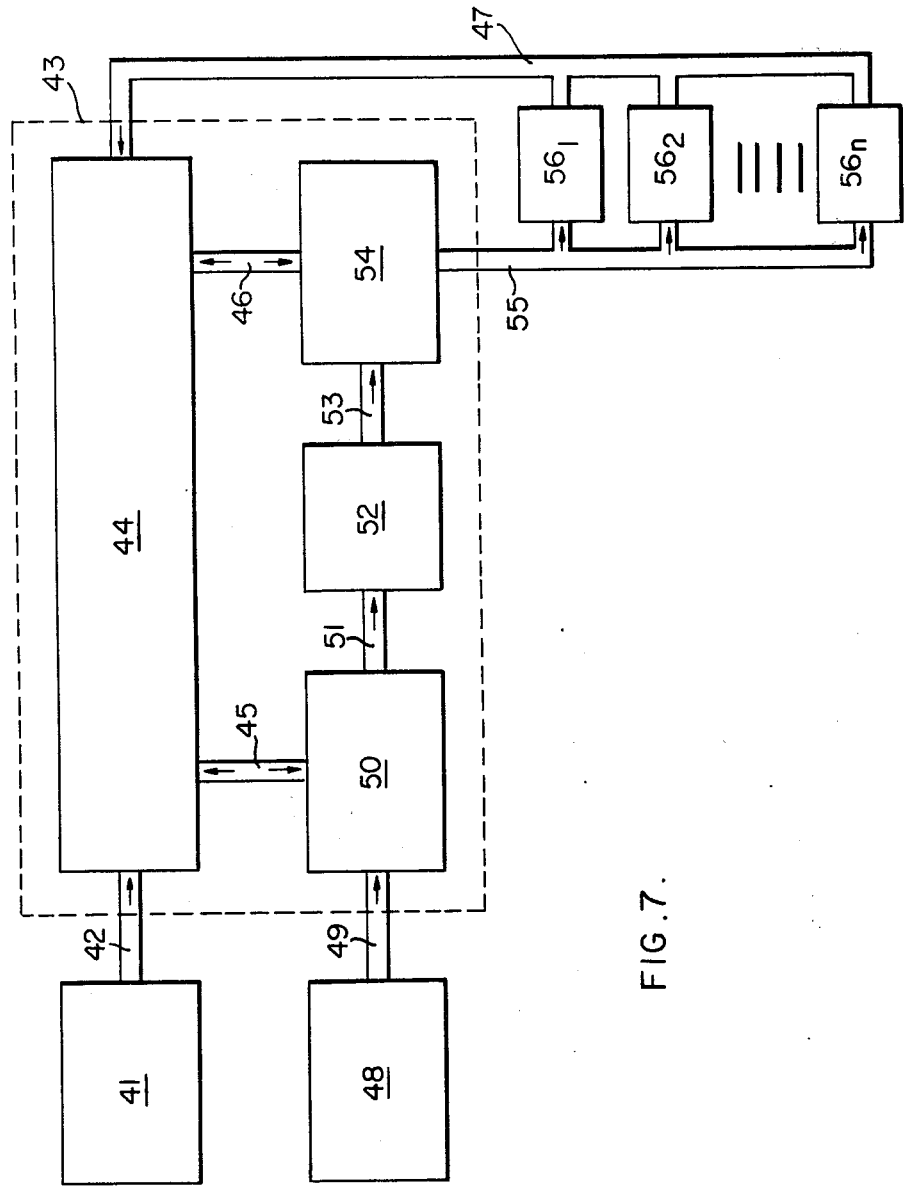
FIG. 7 is a block diagram of the detection and control means of the apparatus according to the invention.

In FIG. 7 block 48 indicates the optical detection station III of FIG. 1. Said station transmits its signals to an electronic unit 43, which is in communication with a programming panel 52 via a transmission path 51. Block 44 represents a central control unit included in the electronic unit for the supervision of the functions and states of the system. Block 44 also comprises means for bringing about alarm functions and interruptions of operation if this is necessary. Block 41 indicates various signal transmitters of the apparatus, e.g. function detectors which record that the gates open and close correctly and passage switches to ensure that the bottles pass through the correct exit. Signals from said signal transmitters are transmitted to the unit 44 by the transmission path 42. There is a two-way connection between units 50 and 44. The program panel 52 can be e.g. as shown in FIG. 8 of said U.S. Pat. No. 3,955,179 or e.g. as shown in FIG. 4, which discloses a so called "X–Y" panel comprising 16 × 16 program points. The horizontal points A–P indicate the bottle types whereas the vertical points indicate the exits 1–16. The choice of which bottle is to be passed through a certain exit is made by placing the program pin in the desired intersection. In the embodiment shown in FIG. 4 the bottle type A goes to exit 1, the bottle type B goes to exit 2, the bottle type C goes to exit 3, and the bottle type D goes to exit 4. A gate control unit 54 is connected with the programming panel by a transmission path 53. On the basis of informations from the program panel and the central control unit 44 by the two-way connection 46 the gate control unit 54 will ensure that the gates $56_1 \ldots 56_n$ (FIG. 7) are opened and closed at the correct points of time. The central control unit 44 informs the gate control unit 54 of the belt velocity of belt E (FIG. 1), so that the operation of gates $56_1 \ldots 56_n$ is transmitted by the transmission path 55. Feedback signals from the gates are transmitted by the path 47 to the central control unit 54. To reduce mechanical wear of the apparatus to a minimum the gate control unit is adjusted so that the position of the gates is only changed when this is necessary. The gates will, thus, be in a resting position both in their open and closed state, i.e. their last operative state. Gates $56_1 \ldots 56_n$ generally indicate the gates as shown in FIGS. 1-3 and 5 and 6. It will also be apparent that the number of gates in an apparatus according to FIG. 1, 5, or 6 is not limited to the disclosed number, as there can be arranged more or less exits, e.g. 16 exits corresponding to the programming panel of FIG. 4. The sorting apparatus according to the invention providing a transport path that enables the bottles to pass directly through the exit station, all kinds of irregular bodies, e.g. like upturned bottles, too closely standing bottles, broken bottles and broken glass or other foreign bodies, will be guided through the entire system and, if desired, recirculated without causing breakdown or the like. In the embodiment according to FIG. 1 such irregular bodies will pass through the exit 8, as the central control unit 44 will record such situations and cause the gate control 54 to open all gates $56_1$ to $56_n$.

As mentioned above, the central control unit controls the sorting apparatus and all exchange of information in the apparatus as well as externally. Additionally there is a continuous control or supervision of all significant points of operation in the system with the object of sounding the following alarms: a maintenance alarm, so that repair may be carried out occasionally or within a certain time limit, or a warning of defect, which causes the apparatus to be stopped automatically in order to avoid damages or other kinds of breakdown. The apparatus comprises a sufficient system of registration to perform an effective control of the state of the apparatus. By using a so called micro processor this control can be performed "intelligently" and most changes of state will be recorded and conveyed to the operators before any breakdown occurs. The most important functions to be supervised are (a) the gate velocity, i.e. if the opening or closing velocity of the gates depart from the established values, errors or wear of said gates are quite accurately indicated. Gates here refer to the mechanical gates, as well as the pneumatic cylinders operating said gates, and magnet valves, and power supplies.

(b) the optical detector unit 48, which is sensitive to dust and fouling. At a certain degree of fouling this will be measured and a cleaning order can be given before the situation has become severe.

(c) the spacing of bottles. If the average spacing of bottles is too high or too low, this will be indicated, so that the supply system can be controlled as regards correct adjustment, errors or defects.

(d) the air pressure, to ensure that it does not exceed or fall short of the established threshold values.

For recording system errors essentially the same detectors are used as for the control of conditions. The most important defects that are supposed to cause a standstill of the apparatus are e.g. that the air pressure to the pneumatic cylinders is too low or too high, that the electric voltage is wrong, that the opening or closing velocities of the gates depart from the determined values, that a detected bottle is not recorded as having passed through the chosen exit path, or that the optical detection unit is defect, which also includes defects of the source of light per se.

The operation of the gates according to FIG. 1 will be described in detail below with reference to FIGS. 2 and 3.

Figure 2:
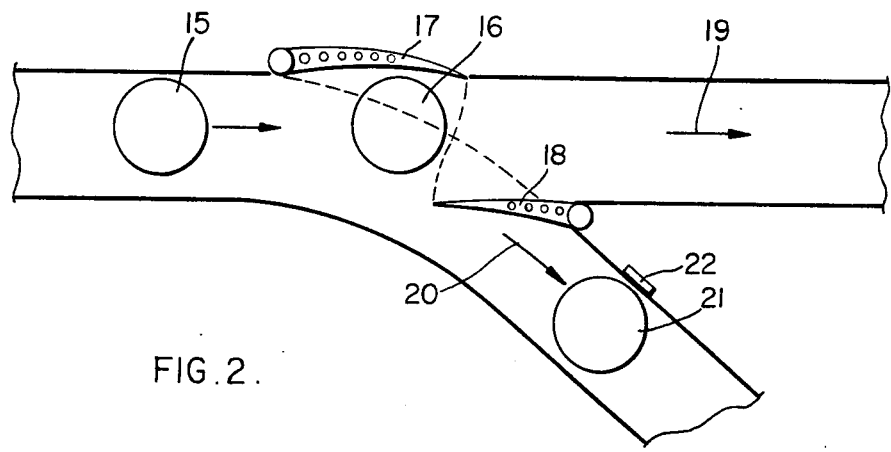
FIG. 2 is a detailed elevation of the gate system of the embodiment shown in FIG. 1.

FIG. 2 shows how bottles 15,16, and 21 pass through the system. The bottle 21 has already been guided in the direction of the arrow 20. The detector 22 detects that the bottle 21 has passed through the correct exit. The detector 22 may be part of the unit 41 (FIG. 7). As will appear from FIG. 2, gates 17 and 18 were closed, i.e. in the position indicated by the dotted line between their pivots. The bottle 16 is programmed for passing to an exit beyond the above mentioned exit. Immediately after the bottle 21 has passed the gates 17 and 18, said gates are, thus, opened as shown in FIG. 2, so that the bottle 16 may pass straight on. Provided that the bottle 15 is programmed for the same exit path as the bottle 21, the gates 17 and 18 will close as soon as the bottle 16 has passed the sharp edge of the gate 17. By using two gate halves 17 and 18 a considerably higher velocity of operation is achieved than had been possible with only one gate at each exit.

The mechanical operation of the gates will now be described with reference to FIG. 3. A control signal is supplied to the magnet valve 36,35, which causes the gate 40 to close by the aid of the pneumatic cylinder 39. A control signal to the magnet valve 32/33 causes an opening of the gate 40. A control signal to the magnet valve 27,26 causes operation of the pneumatic cylinder 28 and opening of the gate 29. A control signal to the magnet valve 23,24 causes the pneumatic cylinder 28 to open and close the gate 29.

When the limit switch 31 is operated, this indicates that the gate 29 is open. When the gate 29 is closed, the limit switch 30 is activated. When the gate 40 is closed, the limit switch 38 is activated, whereas the limit switch 37 is activated when the gate 40 is open. Air is supplied through the connections 25 and 34 to the gates 29 and 40 resp. As will appear from the above mentioned, the two gate halves 29,40, FIG. 3, or 17, 18, FIG. 2, are independently controlled. In this manner it is possible to achieve the highest possible angular velocity of the gate halves and the smallest possible space between bottles to be passed through the apparatus, since opening and closing of the gate halves can take place in a sequence controlled by the gate control unit 54. As shown in FIG. 3, both gate halves are provided with limit switches, the switches 30,31 for gate 29, and the switches 37 and 38 for gate 40. By the aid of said limit switches the position of the gates is confirmed and the reaction velocity can be accurately measured. The bottle detector 22 in the exit path, as mentioned, serves to control the mechanical sorting.

A second embodiment of the apparatus according to the invention is disclosed in FIG. 5. By way of example FIG. 5 shows only two exits 5 and 6 and an exit 8 corresponding to exit 8 of FIG. 1. The belt P has a lower velocity than the belt E, the belt Q has a lower velocity than the belt P, and the belt R has either a lower velocity than the belt Q or the same velocity as the belt Q. The bottle 7 in the shown example is to pass through the exit 6. The bottle arrives with a high velocity (e.g. 3 m/second) on the belt E, passes the open gate 5' and hits the "closed" gate 6' which extends somewhat into said belt E. The velocity vector of the bottle 7 is, thus, turned towards the exit 6 and the bottle is moved away from the belt E towards the belt P and the exit 6, as indicated in the figure. This alternative solution, however, means that the forwarding angle of the bottle 7 from the belt E to the belt P is somewhat smaller than in the case of the embodiment according to FIG. 1. In the embodiment according to FIG. 5 said angle is preferably 15°–25°, whereas the corresponding angle in FIG. 1 is preferably 25°–40°. By "forwarding angle angle" is meant the angle between the forwarding direction of the bottle towards its exit and the direction of the belt E. Since all conveyer belts E,P,Q, and R move in the same direction, the bottle 7 will rest against one wall of the guide towards the exit 6, as shown in FIG. 5. Thereby a controlled guidance towards the exit 6 is ensured. A corresponding guidance is of course also achieved in FIG. 1. The units I–VI of FIG. 5 have the same function as corresponding units of FIG. 1. The mode of operation of the apparatus according to FIG. 5 is as disclosed in connection with FIG. 1.

An alternative embodiment is shown in FIG. 6. The exit station IV here comprises a gate zone V, which in the shown embodiment comprises three gates 9',10',11', and a retardation zone VI, which in the disclosed embodiment comprises three curved conveyer retardation belts K,L, and M, moving to the exits 9, 10, and 11 respectively. The collecting station I, the acceleration station II, and the detecting station III are preferably of the same construction as disclosed in connection with FIG. 1. The mode of operation of the exit station IV in FIG. 6 in connection with the detector and control means of FIG. 7 is essentially as disclosed in connection with FIG. 1 and FIG. 7.

In the same way as shown in FIG. 5 a passage detector 22 can be provided in the embodiment according to FIG. 6 to detect that the bottles are passing through the correct exit.

In FIG. 6 the gate 9' which can consist of one gate part is in the "closed position". The bottle arriving with high velocity (e.g. 3 m/second) on the conveyer belt E will have its path of movement changed by the curved closed gate 9'. Because of the motional energy the bottle 7 will be flung onto the conveyer belt K and due to centrifugal forces it will conform to the inner surface of the outer wall in a controlled manner. The belt K can be of a conventional curved belt type and preferably has a velocity amounting to approximately $\frac{1}{3}$ to $\frac{1}{2}$ of the velocity of the belt E. Because the centrifugal force will influence the bottle all the time during its movement on the retardation belt, there will also be a reduced possibility for the bottle to tip on the belt. If the bottle is to pass through the exit 11, gates 9' and 10' must be opened and gate 11' must be closed. It should be mentioned that the length of the gates need not be such that the gates extend all over the conveyer belt E in a closed position. This is due to the fact that the movement velocity of the bottle determined by its direction will influence the bottle to move onto the correct retardation belt. The retardation of the bottle from belt E e.g. to belt K will be quite even, the conveyer belt surfaces achieving satisfactory frictional qualities by continuous sprinkling with water. The bottle will, thus, due to its high velocity be subjected to an even retardation before it assumes its even exit velocity determined by the velocity of the belt K.

As in the case of the embodiment shown in FIG. 1, the gates in FIGS. 5 and 6 will also remain in their last operative position until a new control command is given to the gate in question. The operation of gates 9',10', or 11' can be as disclosed in connection with gate 29 in FIG. 3.

In cases of upturned bottles, bottles that arrive too closely, broken bottles, broken glass or other foreign bodies on the belt E, such bodies will be carried through the entire system and pass through exit 8 (as shown in FIG. 1) and if desired be resirculated without causing any breakdown. The central control unit 44 will record such situations and make the gate control 54 open all gates $56_1$ to $56_n$.

In the solution according to FIGS. 5 and 6 the number of active components in the exit station IV is reduced as compared with the solution of FIG. 1. In the embodiment shown in FIG. 6 a steady angular motion of the velocity vector of the bottle is ensured.

Block 41 of FIG. 7 also comprises start and stop buttons for the apparatus according to the invention as well as means for measuring the velocity of the conveyer belts of the system. An accurate measurement of the belt velocity is essential to ensure that the gates are correctly synchronized. Dependent on the belt velocity, especially for belt E a variable retardation of the activisation of the gates will have to be ensured as a function of the velocity of the bottles through the optical detector station III.

When the gate control unit is operated there follows control of all gates as well as a yes/no-determination and a continuous supervision of the velocity of the bottles, which ensures that the activisation of the gates is correct. The operation velocity of the gates can e.g. be in the order of 20 ms from open to closed position.

To ensure a simple maintenance of the apparatus according to the invention all active components, as e.g. the pneumatic means, magnet valves etc. are placed at some height above the conveyer belts. This significantly simplifies exchanges of defect parts and the possibility of supervising the components. Additionally, the components are more protected against fouling and damages due to broken glass or other foreign bodies in this way. To ensure a continuous "lubrication" of the system water spray nozzles are preferably provided at one or several points along the bottle movement path.

Figure 3:
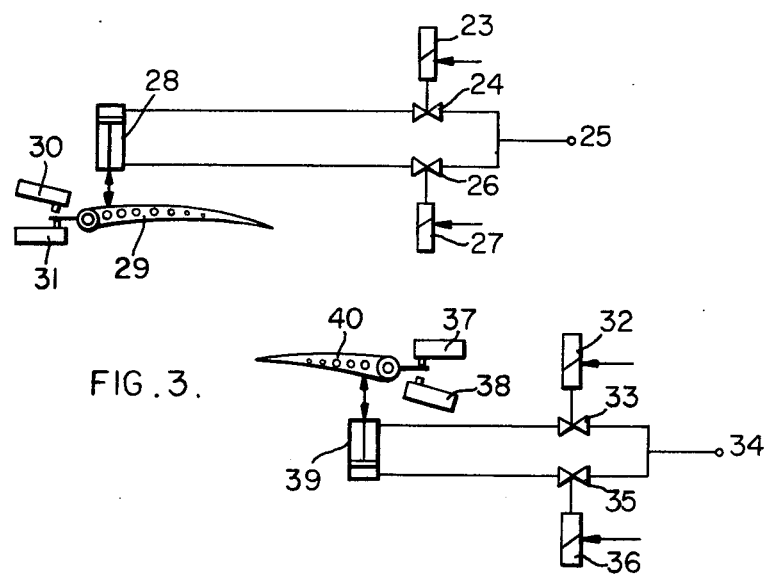
FIG. 3 shows the control means for the gates according to FIG. 2.

To ensure the quickest possible operation of the gate halves of FIGS. 1–3 especially quick acting pneumatic components and two magnet valves for each gate half are preferably utilized. A correspondent solution will also be advantageous for the gates of FIGS. 5 and 6.

The noise level from the pneumatic valves can be reduced by connecting their air outlets with a closed exhaust system.

Because of the simple mechanical construction of the apparatus it is possible to provide the entire sorting apparatus with covers so as to reduce the noice level in the room where the apparatus is to be used and to provide a satisfactory protection. Further modifications are possible within the scope of the invention as stated in the following claims.

I claim:

1. Apparatus for sorting containers according to an optically discernible characteristic comprising main conveyor means for carrying containers along a path through a recognition station and to a separating station, at least two exits from said conveyor means, each exit being for containers having assigned characteristics, director means associated with each exit and operable to direct a container from said conveyor means to its associated exit; optical detector means disposed at said recognition station and generating a signal related to the characteristics of a container passing that detector means, a memory unit storing data related to container characteristics, comparator means comparing signals generated by said detector means with data of said memory unit and control means responsive to said comparator for operating selected ones of said director means to direct a container to an appropriate exit, means for retarding containers delivered to said exit from said main conveyor means and wherein said retarding means comprises at least two parallel conveyors and means causing containers to move progressively from one of said conveyors to an adjacent conveyor said adjacent conveyor moving at a lesser speed than said one conveyor.

2. Apparatus as claimed in claim 1 wherein said accelerator station comprises at least two parallel conveyors and means causing containers to move progressively from one of said conveyors to an adjacent conveyor, said adjacent conveyor moving at a greater speed than said one conveyor.

3. Apparatus as claimed in claim 1 wherein said director means comprises gates movable between an operative position extending across the path of a container traveling on said main conveyor means to divert a container to its associated exit and an inoperative position withdrawn from said path.

4. Apparatus as claimed in claim 3 wherein said control means are effective to hold said gates in either one of the operative and inoperative positions until a signal is generated by said detector means causing a movement of said gate to the other of said positions.

5. Apparatus as claimed in claim 3 wherein each gate comprises two half gates.

6. Apparatus as claimed in claim 5 wherein one half gate of each gate is disposed at one side of said main conveyor means and the other half gate of said gate is disposed at the opposite side of said main conveyor means.

7. Apparatus as claimed in claim 6 wherein each half gate is mounted for pivotal movement between said operative and inoperative positions.

8. Apparatus as claimed in claim 7 wherein one half gate of each gate moves counterclockwise from said operative to said inoperative position and the other half gate moves clockwise from its operative to its inoperative position.

9. Apparatus as claimed in claim 6 wherein said half gates include curved container engaging surfaces forming a curved wall extending across the main conveyor means in the operative positions thereof.

10. Apparatus as claimed in claim 3 wherein each gate is curved and in its operative position extends at least in part across the width of the main conveyor means.

11. Apparatus as claimed in claim 1 where means are provided for sprinkling said main conveyor means with water.

12. Apparatus as claimed in claim 1 wherein means are provided for recirculating containers passing all of said exits to said recognition station.

13. Apparatus for sorting containers according to an optically discernible characteristic comprising main conveyor means for carrying containers along a path through a recognition station and to a separating station, at least two exits from said conveyor means, each exit being for containers having assigned characteristics, director means associated with each exit and operable to direct a container from said conveyor means to its associated exit; optical detector means disposed at said recognition station and generating a signal related to the characteristics of a container passing that detector means, a memory unit storing data related to container characteristics, comparator means comparing signals generated by said detector means with data of said memory unit and control means responsive to said comparator for operating selected ones of said director means to direct a container to an appropriate exit; a container receiving station including a conveyor along which containers exit said receiving station singly at a first speed, an accelerator station receiving containers at said first speed and accelerating them for delivery to said main conveyor means at a second, greater speed, thus to increase the spacing between said containers, means for retarding containers delivered to said exit from said main conveyor means and wherein said retarding means comprises at least two parallel conveyors and means causing containers to move progressively from one of said conveyors to an adjacent conveyor said adjacent conveyor moving at a lesser speed than said one conveyor.

14. Apparatus as claimed in claim 13 wherein means are provided for sprinkling said conveyors with water.

15. Apparatus for sorting containers according to an optically discernible characteristic comprising main conveyor means for carrying containers along a path through a recognition station and to a separating station, at least two exits from said conveyor means, each exit being for containers having assigned characteristics, director means associated with each exit and operable to direct a container from said conveyor means to its associated exit; optical detector means disposed at said recognition station and generating a signal related to the characteristics of a container passing that detector means, a memory unit storing data related to container characteristics, comparator means comparing signals generated by said detector means with data of said memory unit and control means responsive to said comparator for operating selected ones of said director means to direct a container to an appropriate exit, means for retarding containers delivered to said exit from said main conveyor means and wherein said retarding means comprises a number of curved guide elements said guide elements comprising a belt conveyor and means for driving that belt conveyor at uniform angular velocity.

16. Apparatus as claimed in claim 15 wherein each guide element has a substantially constant radius of curvature along the greater part of its length.

17. Apparatus as claimed in claim 15 wherein each guide element has a fixed center of curvature along the greater part of its length.

18. Apparatus as claimed in claim 15 wherein said guides elements are of U-shape.

* * * * *